United States Patent
Read

(10) Patent No.: US 11,130,185 B2
(45) Date of Patent: Sep. 28, 2021

(54) REVERSIBLE METAL-DETECTING SAWMILL SYSTEM

(71) Applicant: Brian Read, Wauwatosa, WI (US)

(72) Inventor: Brian Read, Wauwatosa, WI (US)

(*) Notice: Subject to any disclaimer, the term of this patent is extended or adjusted under 35 U.S.C. 154(b) by 0 days.

(21) Appl. No.: 16/354,144

(22) Filed: Mar. 14, 2019

(65) Prior Publication Data

US 2019/0210129 A1     Jul. 11, 2019

Related U.S. Application Data

(63) Continuation-in-part of application No. 15/159,914, filed on May 20, 2016, now abandoned, which is a continuation-in-part of application No. 14/997,776, filed on Jan. 18, 2016, now abandoned.

(60) Provisional application No. 62/274,645, filed on Jan. 4, 2016.

(51) Int. Cl.
    *B23D 59/00*     (2006.01)
    *B23D 61/02*     (2006.01)
    *B27B 33/02*     (2006.01)

(52) U.S. Cl.
    CPC ......... *B23D 59/005* (2013.01); *B23D 59/001* (2013.01); *B23D 59/008* (2013.01); *B23D 61/021* (2013.01); *B23D 61/025* (2013.01); *B27B 33/02* (2013.01)

(58) Field of Classification Search
CPC .. B23D 59/005; B23D 59/001; B23D 59/008; B23D 61/021; B23D 61/025; B27B 33/02
See application file for complete search history.

(56) References Cited

U.S. PATENT DOCUMENTS 1,716,976 A * 6/1929 Prentice ............... B23D 61/121
                                                              83/850

FOREIGN PATENT DOCUMENTS

FR           2886194 A1 * 12/2006 ........... B23D 61/021

* cited by examiner

*Primary Examiner* — Omar Flores Sanchez
(74) *Attorney, Agent, or Firm* — Jansson Munger McKinley & Kirby Ltd.

(57) ABSTRACT

A machine-driven saw blade including (1) a blade body having a blade body edge with a plurality of primary saw teeth for cutting during blade movement in a first direction, the primary teeth spaced at a primary tooth pitch and each having a primary tooth tip and primary-tooth leading and trailing edges and (2) at least one secondary saw tooth on the trailing edge of a subset of primary saw teeth, the at least one secondary saw tooth having a secondary tooth tip and a secondary-tooth leading edge configured for cutting during blade movement in a second direction opposite the first direction.

23 Claims, 5 Drawing Sheets

REVERSIBLE METAL-DETECTING SAWMILL SYSTEM

RELATED APPLICATIONS

This application is a continuation-in-part of patent application Ser. No. 15/159,914 filed on May 20, 2016, which is a continuation-in-part of patent application Ser. No. 14/997,776, filed Jan. 18, 2016, which claims the benefit of Provisional Application No. 62/274,645, filed Jan. 4, 2016. Such prior applications are incorporated by reference herein in their entirety.

FIELD OF THE INVENTION

The present invention relates to the field of cutting and subtractive manufacturing, and more specifically to an optimized saw blade and sawmill apparatus for use in milling operations.

BACKGROUND OF THE INVENTION

Subtractive manufacturing refers to machining processes in which a piece of raw material, such as wood or metal, is cut into a desired final shape and size by a controlled material-removal process. Milling is one such controlled material-removal process that typically uses bandsaws or rotary saws to remove portions of material from a workpiece by advancing (or feeding) a workpiece to come into contact with cutting teeth positioned on a moving-band blade or rotating saw blade. The saw blade is typically a bandsaw blade or a circular saw blade.

During a milling operation, the cutting surface on the tip of each saw blade tooth penetrates the workpiece, pushing, shaving or shearing off a continuous chip of material as the tooth moves. This chip remains in the gullet, the space between the tooth tip and the inner surface of the blade. Once the tooth is free from the workpiece, the chip falls away from the gullet, freeing the tooth to cut away another chip during the next tooth engagement with a workpiece.

A defining characteristic of a milling apparatus is that the workpiece moves perpendicular to the axis of rotational movement of the bandsaw and circular saw blades. A further defining characteristic of such milling is the precise geometry of the saw blade teeth, which have a cutting surface and curvature that simultaneously cuts into the workpiece and removes material in a carefully controlled manner to perform precise shearing.

Milling systems have become increasingly sophisticated with the integration of computer numerical control (CNC) technologies. Many systems incorporate multiple milling functions, and include sensors to monitor the status of the cutting tools and the workpieces. Many attempts have been made in the prior art to increase throughput (feed rate) without damaging saw blade components and causing system down time and error due to damage to the saw blades.

There are several factors that affect cutting efficiency: saw blade and tooth design, blade tip speed, workpiece feed rate and gullet capacity. Saw blades must be carefully engineered, drawing upon material science concepts and a large existing body of research as to the relationship of tooth geometry and the materials being cut. Saw tooth geometry is highly specific to the type of material being cut. Furthermore, the material being cut and the size and shape of the material dictates the appropriate tooth pitch of the blade, otherwise described by teeth per inch (TPI).

Increasing blade tip speed increases cutting efficiency. Blade tip speed is restricted, however, by the machinability of the material and how much resistance to cutting is occurring. Too high a blade tip speed or very hard materials produce excessive wear, resulting in reduced blade life and potential damage to the workpiece.

Workpiece feed rate (sometimes referred to as feed) refers to the depth of penetration of the saw blade tooth into the material being cut. Variables affecting feed rate may include but are not limited to the type of material being cut, the saw blade material, blade life expectancy or optimization. A higher feed rate (deeper feed) results in a lower shear plane angle (angle at which the chip shears off) and faster cutting, but dramatically reduced blade life. A lower feed rate increases the blade life, but also increases the shear plane angle and decreases cutting efficiency.

Gullet capacity also affects cutting efficiency. As the tooth scrapes away the material during a cut, the chip curls up into the gullet. A blade with the proper clearance for the cut allows the chip to curl up uniformly and fall away from the gullet. If too much material is scraped away, the chip will jam into the gullet area causing increased resistance. This loads down the machine, wastes energy and can cause damage to the blade.

It is a problem known in the art that even brief contact of a woodcutting saw blade with metal during a wood milling operation could cause significant damage to the blade, as well as substantial downtime for a milling facility. In theory, such damage can occur from any foreign material embedded in the wood. Furthermore, such damage can also occur in operations cutting other substances, such as metal or cork, when a saw blade encounters foreign objects in a workpiece.

Attempts have been made to mitigate this damage, such as use of sensors. One design uses a sensor embedded in the surface supporting the workpiece to detect metal before it comes into contact with the saw blade. However, if the workpiece is too thick for accurate detection or the metal does not properly align with the sensor, detection may not occur in time to prevent damage to the blade.

OBJECTS OF THE INVENTION

It is an object of the present invention to protect sawmill systems from costly damage caused by embedded objects made of metal and other materials that damage saw blades.

Another object of this invention is to provide a saw blade which is more versatile and durable than those that are currently known in the art.

Another object of this invention is to provide a saw blade which can cut material, including foreign objects, when the saw blade is driven in the reverse direction.

Another object of the present invention is to provide a sawmill system which can adjust to and overcome the presence of a foreign object after detection prior to the foreign object being encountered by the saw blade of the milling system.

It is a further object of the present invention to control the driven direction of the saw blade of the milling system based on the detection of a foreign object such that the saw blade direction is reversed in order to cut the foreign object.

Yet another object of the present invention is to control the workpiece feed rate such that the workpiece is not driven into the saw blade while the blade is not moving in the proper direction and at an adequate speed for cutting of the workpiece.

These and other objects of the invention will be apparent from the following descriptions and from the drawings.

SUMMARY OF THE INVENTION

The present invention is a machine-driven saw blade which comprises (1) a blade body having a blade body edge which has a plurality of primary saw teeth for cutting during blade movement in a first direction, the primary teeth being spaced at a primary tooth pitch and each primary tooth having a primary tooth tip and primary-tooth leading and trailing edges and (2) at least one secondary saw tooth on the trailing edge of a subset of primary saw teeth, the at least one secondary saw tooth having a secondary tooth tip and a secondary-tooth leading edge configured for cutting during blade movement in a second direction opposite the first direction.

In some highly-preferred embodiments of the inventive saw blade, each primary saw tooth has a primary hook angle which is positive, and the at least one secondary saw tooth has a secondary hook angle which is less than the primary hook angle. In some of these embodiments, the secondary hook angle is negative.

In some highly-preferred embodiments, the saw blade further includes (a) a primary tip-movement path and (b) a secondary tip-movement path which is the tip-movement path along which the tip of the at least one secondary saw tooth nearest its corresponding primary saw tooth moves, and the primary and secondary tip-movement paths are substantially the same but in opposite directions. In some of these embodiments, the tip-movement paths may be circular, linear, or elliptical.

In some embodiments, at least one primary tooth tip comprises a first material and the at least one secondary tooth tip comprises a second material that is different from the first material.

In some highly-preferred embodiments, the at least one secondary saw tooth is at least two secondary saw teeth spaced at a secondary tooth pitch.

In another aspect of the present invention, a machine-driven saw blade comprises a blade body with a blade body edge having (i) a plurality of primary saw teeth for cutting during blade movement in a first direction, the primary teeth being spaced at a primary tooth pitch and each having a primary tooth tip and (ii) at least one secondary saw tooth located between a subset of adjacent primary saw teeth, the at least one secondary saw tooth having a secondary tooth tip and a secondary-tooth leading edge being configured for cutting during blade movement in a second direction opposite the first direction.

Another aspect of the present invention is a sawmill system comprising: (1) a cutting saw including a saw blade having (a) a blade body having a blade body edge which has a plurality of primary saw teeth for cutting during blade movement in a first direction, the primary teeth being spaced at a primary tooth pitch and each having a primary tooth tip and primary-tooth leading and trailing edges, and (b) at least one secondary saw tooth on the trailing edge of a subset of primary saw teeth, the at least one secondary saw tooth having a secondary tooth tip and a secondary-tooth leading edge configured for cutting during blade movement in a second direction opposite the first direction; (2) at least one material sensor for sensing the presence of a foreign object within a workpiece prior to the blade engaging the foreign object and configured to transmit a signal indicating said presence; and (3) computer-based processing apparatus configured to receive the signal and to control movement of the saw blade in response thereto.

In highly-preferred embodiments of the invention, controlling saw blade movement includes reversing blade movement. In some of these embodiments, the blade movement is rotational, and in some, the blade movement is linear.

In some highly-preferred embodiments, the computer-based processing apparatus is configured to control workpiece feed rate prior to the blade engaging the foreign object.

The term "primary" as used herein when describing saw teeth refers to saw teeth which cut through the predominant material of a workpiece.

The term "secondary" as used herein when describing saw teeth refers to saw teeth which cut through foreign objects found within a workpiece.

The term "foreign object" as used herein refers to an object located at least partially within a workpiece and having a material composition different from that of the workpiece.

The term "tooth pitch" as used herein refers to the distance from the tip of one tooth to the tip of the next tooth.

The terms "subset of primary saw teeth" as used herein refers to a group of primary saw teeth consisting of from one to all of the primary teeth on a saw blade.

The terms "subset of adjacent primary saw teeth" as used herein refers to a group of pairs of primary saw teeth consisting of from one to all of the possible neighboring pairs of primary saw teeth on a saw blade.

The term "gullet" as used herein refers to the space between the tooth tip and the inner surface of the blade, often a curved space at the base of the tooth. A gullet may be described using measurements including but not limited to gullet depth and gullet capacity. The term "gullet capacity" as used herein refers to the amount of material removed from a workpiece that a gullet can contain. The term "gullet depth" as used herein refers to the distance from the tip of a blade tooth tip to the bottom of the gullet.

The term "hook angle" as used herein refers to the amount of forward or backward lean of the leading edge of a saw tooth. A hook angle is the angle at which the saw tooth tip enters a workpiece. A positive hook angle means that the tip of a tooth engages the workpiece before the remainder of the leading edge. Most saw blades have teeth having a positive hook angle. Steeper positive hook angles are used for cutting softer materials such as wood. Harder materials may require more shallow hook angles, and metals generally require blades with a negative hook angle.

The term "material sensor" as used herein refers to any sensor known in the art capable of detecting the presence of a foreign object in a workpiece. Among these may be magnetic sensors, ultrasonic sensors, and X-ray sensors the material sensors used are not intended to be limited by this list.

DETAILED DESCRIPTION OF PREFERRED EMBODIMENTS

Figure 1A:
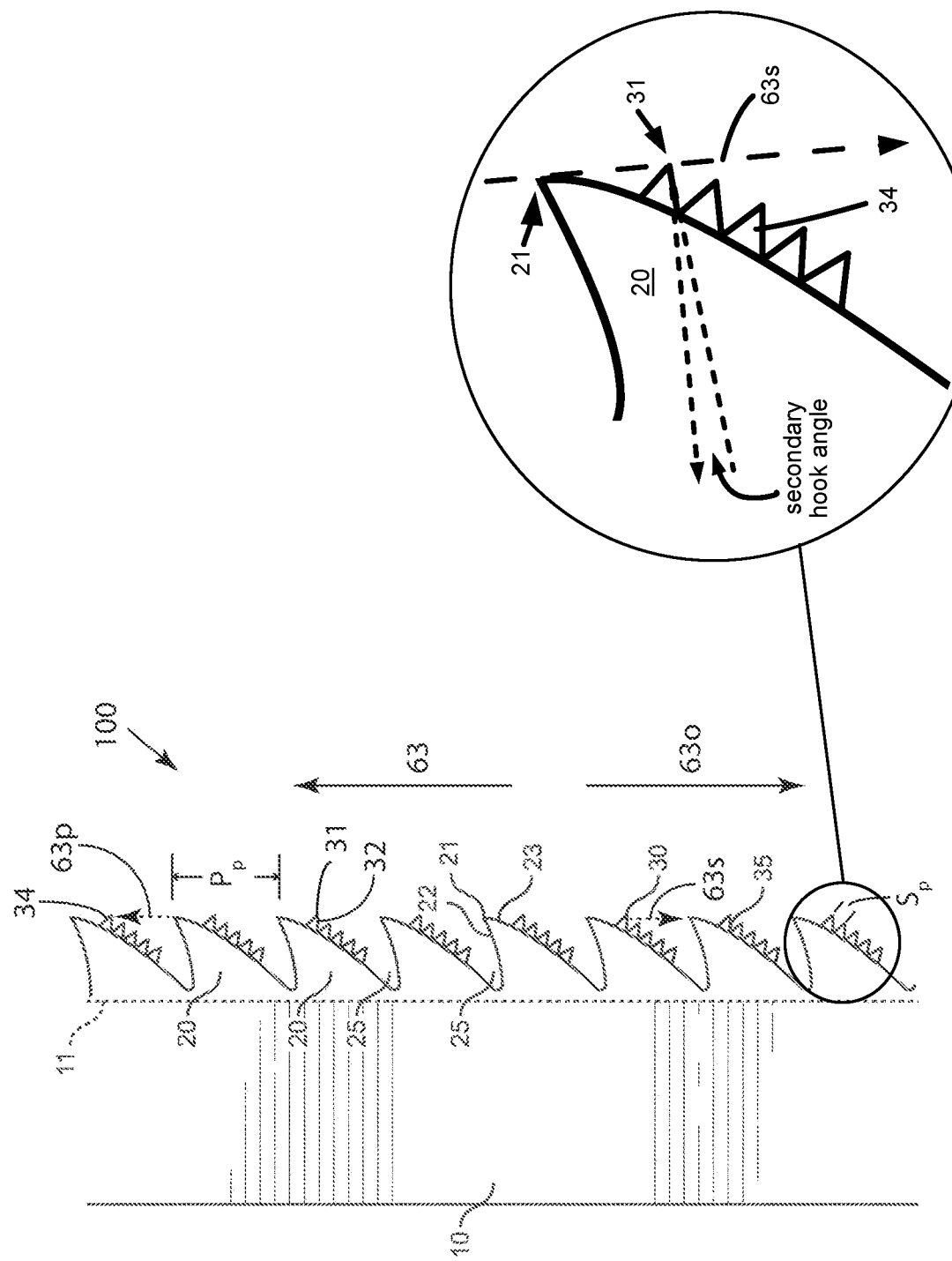
FIG. 1A is a side view drawing of a portion of a linear saw blade, such as a bandsaw blade, a reciprocating-motion or an elliptical-motion saw blade. The blade portion has primary and secondary saw teeth according to the present invention.
Figure 1B:
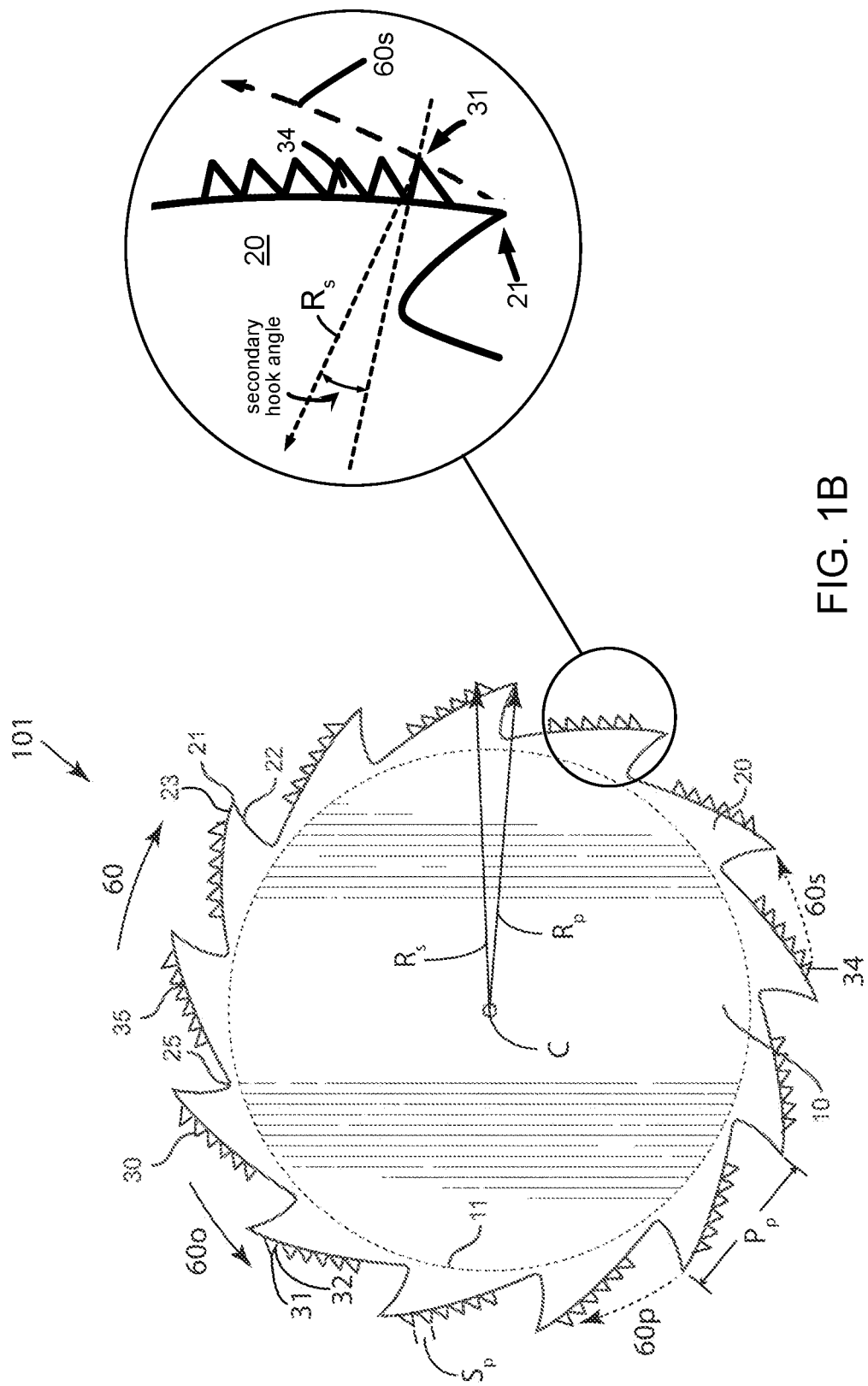
FIG. 1B is a side view drawing of a circular saw blade having primary and secondary saw teeth according to the present invention.

FIGS. 1A and 1B illustrate alternative embodiments of the machine-driven saw blade of this invention. FIG. 1A shows a portion 100 of a machine-driven linear saw blade. (Reference number 100 herein is used to indicate either blade portion 100 or linear blade 100.) Linear blade 100 is driven such that blade 100 moves to create linear tip movement in a first direction 63 relative to a workpiece (not shown). FIG. 1B shows a side view of a circular saw blade 101 which is rotationally-driven around an axis perpendicular to the plane of the image passing through a rotational center C. (Certain structure associated with both blades 100 and 101 are described using common reference numbers based on the commonality of such structures.) Circular tip movement in a first direction 60 is indicated by arrow 60. Saw blades 100 and 101 are configured to cut different materials by being able to cut in either first directions 63 and 60 or in second directions 63o and 60o which are opposite to first directions 63 and 60, respectively.

Saw blades 100 and 101 each include a blade body 10 having a blade edge 11 as indicated by a straight dotted line 11 (blade 100) and a dotted circular line 11 (blade 101). Blade edges 11 include a plurality of primary saw teeth 20 which are spaced at a primary tooth pitch $P_p$. As indicated above, the term "tooth pitch" refers to the distance from the tip of one tooth to the tip of the next tooth.

Each primary tooth 20 includes a primary tooth tip 21, a primary-tooth leading edge 22, and a primary-tooth trailing edge 23. Primary saw teeth 20 of blade 100 are configured to cut a workpiece in first direction 63, and primary saw teeth 20 of blade 101 are configured to cut a workpiece in first direction 60. The region between primary-tooth trailing edge 23 of one primary saw tooth 20 and the primary-tooth leading edge 22 of the next or neighboring primary saw tooth 20 is referred to as a primary gullet 25.

Primary-tooth trailing edge 23 of each primary tooth 20 includes a plurality of secondary saw teeth 30 which are spaced at a secondary tooth pitch $S_p$. Each secondary saw tooth 30 includes a secondary tooth tip 31 and a secondary-tooth leading edge 32 which are configured to cut embedded foreign objects located in the workpiece when blades 100 and 101 are driven in second directions 63o and 60o. In a similar fashion to primary teeth 20, the regions between neighboring secondary teeth are referred to as secondary gullets 35.

In certain embodiments of the inventive saw blade such as embodiments 100 and 101, the value of primary tooth pitch $P_p$ may vary along blade edges 11, and in certain embodiments, the value of secondary tooth pitch $S_p$ may vary along primary-tooth trailing edges 23 and/or among the plurality of primary teeth 20 of blades 100 or 101. Since the material composition of foreign objects typically differs from the bulk material composition of a workpiece, at least one primary tooth tip 21 may be made of a first material and at least one secondary tooth tip 31 may be made of a second material that is different from the first material.

Figure 1C:
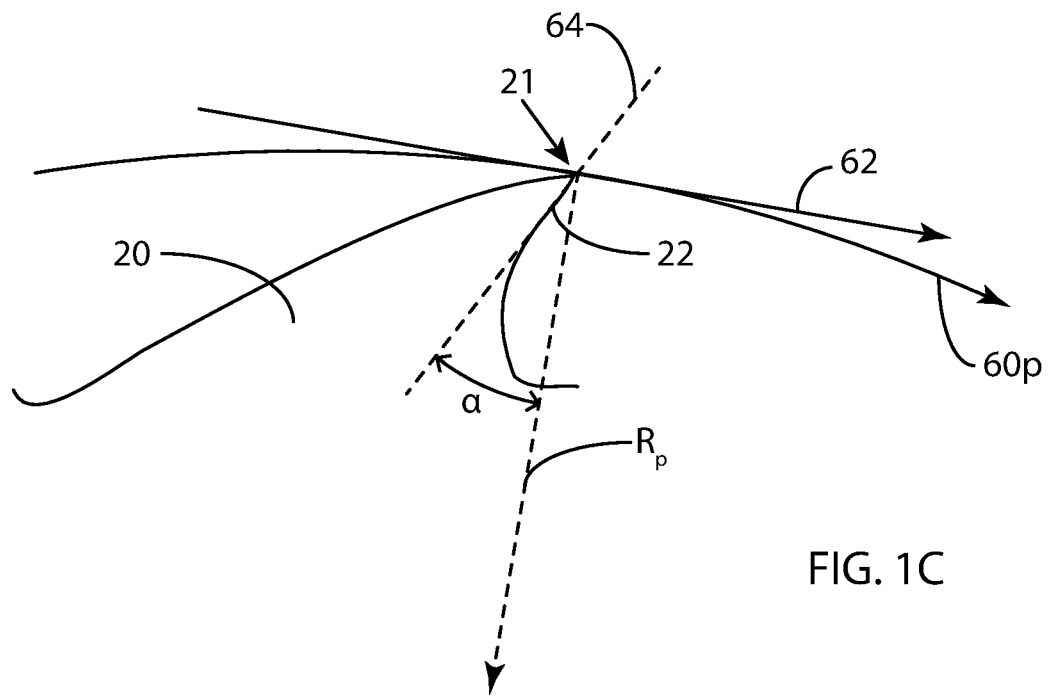
FIG. 1C is a diagram illustrating the relative movement and orientation of an exemplary primary saw tooth of a circular saw blade.

FIG. 1C is a diagram illustrating the relative movement and orientation of one exemplary primary saw tooth 20 of saw blade 101. For purposes of the description of this diagram, secondary teeth 30 are not shown. Circular arc 60p illustrates a section of a tip-movement path 60p of primary tooth tip 21, and arrow 62 illustrates the instantaneous direction 62 of tip-movement at primary tooth tip 21 along tip-movement path 60p. The dotted-line arrow $R_p$ is along a radius $R_p$ of blade 101 which passes through center C (see FIG. 1B) and is by definition perpendicular to instantaneous direction 62 of tip-movement at primary tooth tip 21. Primary-tooth leading edge 22 of primary tooth 20 is indicated by dotted line 64, and a hook angle α is defined as the angle between line 64 and radius R as shown. In this illustration, hook angle α is a positive angle. As described above, a positive hook angle α results in primary tooth tip 21 engaging the workpiece before the remainder of leading edge 22. An 18-22 degree positive hook angle may be used on rip blades to pull softer workpiece materials such as wood into blade 101. Hard materials require a shallow hook angle, and some materials may require negative values of hook angle α.

Figure 1D:
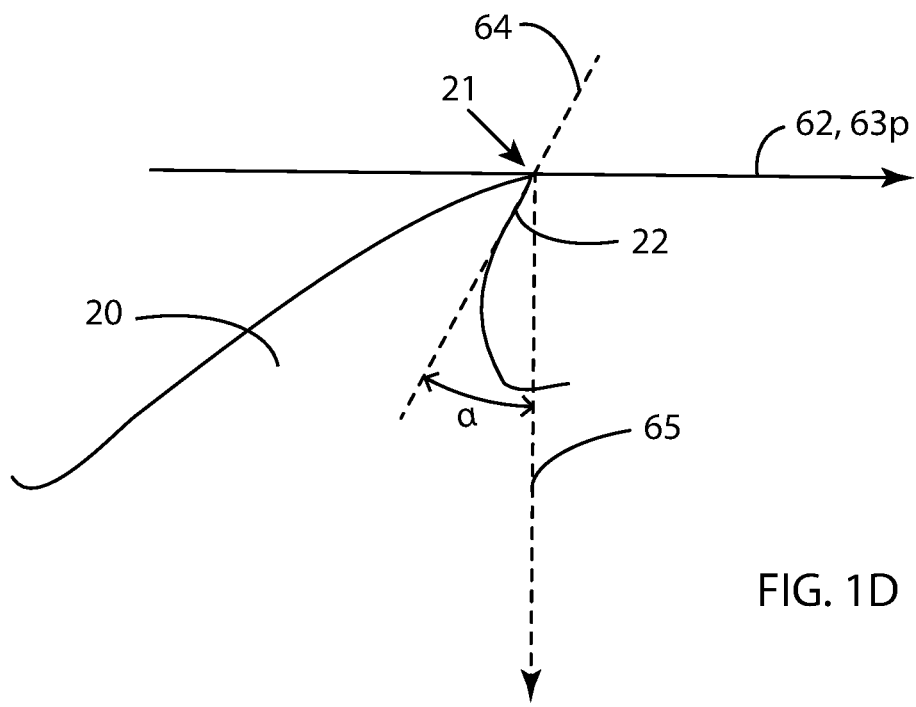
FIG. 1D is a diagram illustrating the relative movement and orientation of an exemplary primary saw tooth of a linear saw blade.

In similar fashion to FIG. 1C, FIG. 1D is a diagram illustrating the relative movement and orientation of one exemplary primary saw tooth 20 of saw blade 100. Again, secondary teeth 30 need not be shown. The arrow (labeled 62, 63p) illustrates a section of a tip-movement path 63p of primary tooth tip 21 and instantaneous direction 62 of tip-movement at primary tooth tip 21 along tip-movement path 63p. The dotted-line arrow 65 is along a line perpendicular to tip-movement path 63p and instantaneous direction 62 of tip-movement at primary tooth tip 21. Primary-tooth leading edge 22 of primary tooth 20 is indicated by dotted line 64, and a hook angle β is defined as the angle between line 64 and line 65 as shown. Again, hook angle β is a positive angle.

FIGS. 1C and 1D serve to define hook angle for saw blade teeth, and the hook angle of secondary teeth of saw blades 100 and 101 have the same relationships to tooth leading edges and tip-movement as have been described. As described above, the cutting of metals generally requires blades with a negative hook angle, and negative values of β are numerically less than positive values. In saw blades 100 and 101, each primary saw tooth 20 may have a primary hook angle which is positive, and the secondary saw teeth may have a secondary hook angle which is less than the primary hook angle, and in some cases, the secondary hook angle may be negative.

Referring again to FIG. 1A, primary tip-movement path 63p and a secondary tip-movement path 63s are indicated by dotted line arrows having the same reference numbers. Secondary tip-movement path 63s is the tip-movement path along which secondary tooth tip 31 of secondary saw tooth 34 which is nearest its corresponding primary saw tooth 20 moves. Primary and secondary tip-movement paths 63p and 63s are substantially the same but in opposite directions.

Referring now to FIG. 1B, primary tip-movement path 60p and a secondary tip-movement path 60s are indicated by dotted lines with arrows having the same reference numbers. Secondary tip-movement path 60s is the tip-movement path along which the tip of secondary saw tooth 34 which is nearest its corresponding primary saw tooth 20 moves. A radius $R_s$ of the tooth tip 31 of secondary tooth tip 34 is the same as radius $R_p$ of primary tooth tips 21, and thus primary and secondary tip-movement paths 60p and 60s are substantially the same but in opposite directions.

Tip-movement paths may be other than linear and circular, depending on what drive is used to create the motion of the saw blade. For example, a linear blade 100 may be a short blade mounted in a reciprocating saw which has an elliptical motion, thus creating an elliptical tip-movement path.

Figure 2:
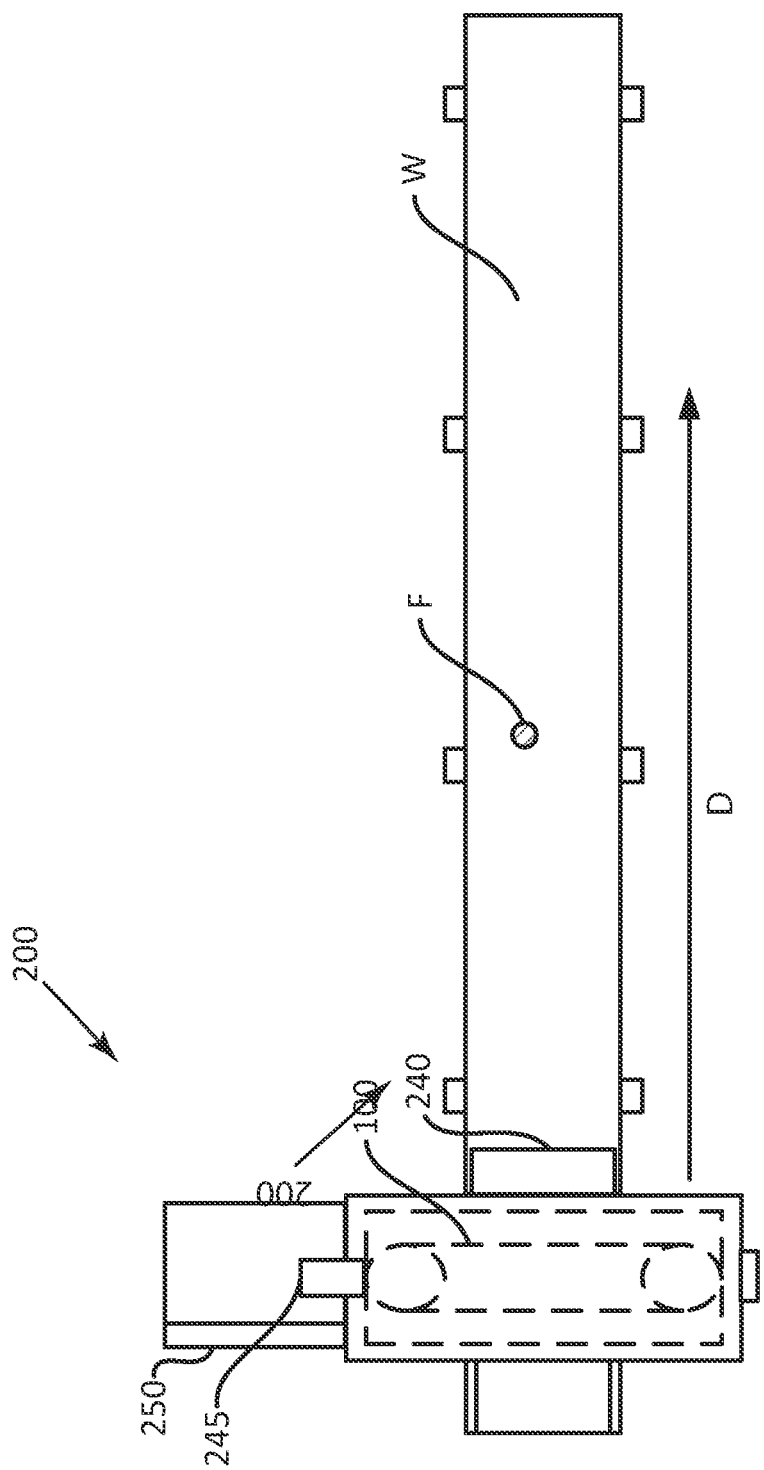
FIG. 2 illustrates a schematic representation of an exemplary embodiment of the inventive sawmill system of this invention.

FIG. 2 illustrates a schematic representation of an exemplary embodiment 200 of the inventive sawmill system of this invention. (The reference number 200 is used herein to refer to the sawmill system 200 as well as embodiment 200.) In this example, sawmill system 200 includes one saw blade 100 but in other embodiments may include more than one saw blade 100 or may include one or more saw blades 101. In FIG. 2, saw blade 100 is shown with dotted lines and oriented at an angle with respect to workpiece W different from its operational angle merely to illustrate that the exemplary saw blade 100 in system 200 is a bandsaw blade. Arrow D indicates the relative movement of sawmill system 200 with respect to workpiece W. Of course, in some embodiments, workpiece W may be moved while in other embodiments, sawmill system 200 may be moved.

Sawmill system 200 includes at least one material sensor 240, at least one status sensor 245 and computer-based processing apparatus 250. As described above, saw blade 100 is machine-driven such that saw blade 100 is able to move in two directions (first and second directions) relative to a workpiece W. In use, material sensor 240 determines the presence and location of a foreign object F within workpiece W. Upon detection, material sensor 240 transmits a signal to processing apparatus 250. As mentioned above, material sensor may be a magnetic sensor, an ultrasonic sensor, or an X-ray sensor; the kind and type of material sensor employed is not intended to be limited by this list.

Figure 3:
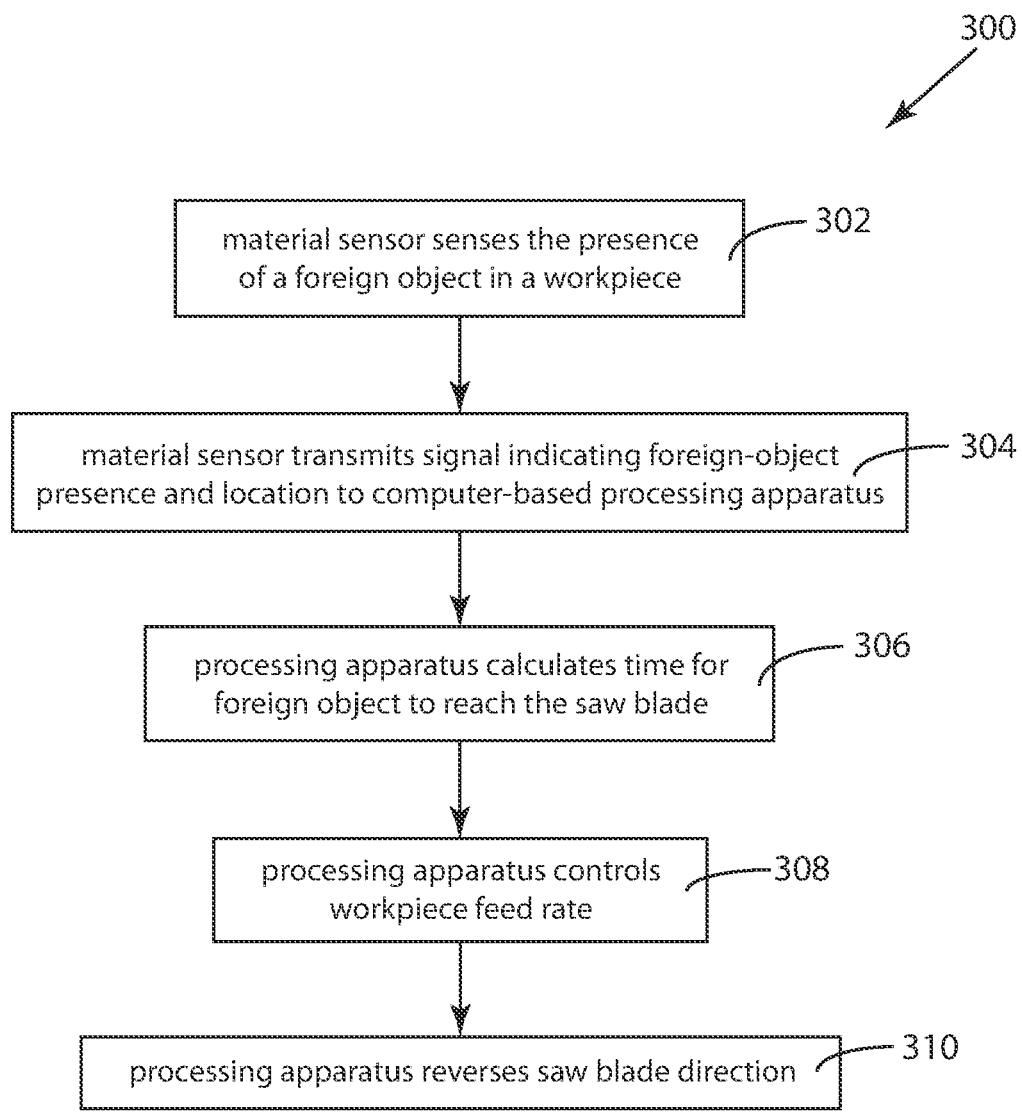
FIG. 3 illustrates an exemplary method for using the inventive sawmill system.

FIG. 3 completes the description of the operation of sawmill system 200. FIG. 3 illustrates an exemplary method 300 for using the inventive sawmill system 200. In method step 302, material sensor 240 detects foreign object F in workpiece W in sawmill system 200. In method step 304, material sensor 240 transmits a signal to computer-based control apparatus 250 indicating the presence and location of foreign object F. In response to the signal, in method step 306 processing apparatus 250 calculates the time for foreign object F to reach saw blade 100, and in method steps 308 and 310, processing apparatus 250 controls the feed rate of workpiece W and the direction of saw blade 100, respectively, so that: (a) saw blade 100 does not engage foreign object F while moving in the first direction, (b) saw blade 100 cuts the predominant material of workpiece W while moving in the first direction, (c) saw blade 100 cuts foreign object F while moving in the second direction, and (d) workpiece W is not fed into saw blade 100 while the direction of saw blade 100 is changing.

Referring again to FIG. 2, at least one status sensor 245 may be used to identify one or more operational parameters of sawmill 200. Such parameters may include motion, position, speed, damage to blade 100, and/or machine-drive temperature, workpiece W orientation, friction, lubrication or other operation parameter.

While the principles of this invention have been described in connection with specific embodiments, it should be understood clearly that these descriptions are made only by way of example and are not intended to limit the scope of the invention.

The invention claimed is:

1. A machine-driven saw blade comprising:
   a blade body having a blade body edge including a plurality of primary saw teeth for cutting during blade movement in a first direction, the primary teeth spaced at a primary tooth pitch and each having a primary tooth tip and primary-tooth leading and trailing edges; and
   at least one secondary saw tooth on the trailing edge of a subset of primary saw teeth, the at least one secondary saw tooth having a secondary tooth tip and a secondary-tooth leading edge configured for cutting during blade movement in a second direction opposite the first direction.

2. The saw blade of claim 1 wherein each primary saw tooth has a primary hook angle which is positive, and the at least one secondary saw tooth has a secondary hook angle which is less than the primary hook angle.

3. The saw blade of claim 2 wherein the secondary hook angle is negative.

4. The saw blade of claim 1 further including:
   a primary tip-movement path;
   a secondary tip-movement path which is the tip-movement path along which the tip of the at least one secondary saw tooth nearest its corresponding primary saw tooth moves; and
   the primary and secondary tip-movement paths are substantially the same but in opposite directions.

5. The saw blade of claim 4 wherein the tip-movement paths are circular.

6. The saw blade of claim 4 wherein the tip-movement paths are linear.

7. The saw blade of claim 4 wherein the tip-movement paths are elliptical.

8. The saw blade of claim 1 wherein at least one primary tooth tip comprises a first material and at least one secondary tooth tip comprises a second material that is different from the first material.

9. The saw blade of claim 1 wherein the at least one secondary saw tooth is at least two secondary saw teeth spaced at a secondary tooth pitch.

10. A machine-driven saw blade comprising a blade body with a blade body edge having:
    a plurality of primary saw teeth for cutting during blade movement in a first direction, the primary teeth spaced at a primary tooth pitch and each having a primary tooth tip; and
    at least one secondary saw tooth located between a subset of adjacent primary saw teeth, the at least one secondary saw tooth having a secondary tooth tip and a secondary-tooth leading edge configured for cutting during blade movement in a second direction opposite the first direction.

11. The saw blade of claim 10 wherein each primary saw tooth has a primary hook angle which is positive, and the at least one secondary saw tooth has a secondary hook angle which is less than the primary hook angle.

12. The saw blade of claim 11 wherein the secondary hook angle is negative.

13. The saw blade of claim 10 further including:
    a primary tip-movement path;
    a secondary tip-movement path which is the tip-movement path along which the tip of the at least one secondary saw tooth nearest its corresponding primary saw tooth moves; and
    the primary and secondary tip-movement paths are substantially the same but in opposite directions.

14. The saw blade of claim 13 wherein the tip-movement paths are circular.

15. The saw blade of claim 13 wherein the tip-movement paths are linear.

16. The saw blade of claim 13 wherein the tip-movement paths are elliptical.

17. The saw blade of claim 10 wherein at least one primary tooth tip comprises a first material and at least one secondary tooth tip comprises a second material that is different from the first material.

18. The saw blade of claim 10 wherein the at least one secondary saw tooth is at least two secondary saw teeth spaced at a secondary tooth pitch.

19. A sawmill system comprising:
   a cutting saw including a saw blade having:
      a blade body having a blade body edge including a plurality of primary saw teeth for cutting during blade movement in a first direction, the primary teeth spaced at a primary tooth pitch and each having a primary tooth tip and primary-tooth leading and trailing edges; and
      at least one secondary saw tooth on the trailing edge of a subset of primary saw teeth, the at least one secondary saw tooth having a secondary tooth tip and a secondary-tooth leading edge configured for cutting during blade movement in a second direction opposite the first direction;
   at least one material sensor for sensing the presence of a foreign object within a workpiece prior to the blade engaging the foreign object and configured to transmit a signal indicating said presence; and
   computer-based processing apparatus configured to receive the signal and to control movement of the saw blade in response thereto.

20. The sawmill system of claim 19 wherein controlling saw blade movement includes reversing blade movement.

21. The sawmill system of claim 20 wherein the blade movement is rotational.

22. The sawmill system of claim 20 wherein the blade movement is linear.

23. The sawmill system of claim 19 wherein the computer-based processing apparatus is configured to control workpiece feed rate prior to the blade engaging the foreign object.

* * * * *